Dec. 2, 1952　　　　S. R. VICKERY ET AL　　　　2,619,732
SCIENTIFIC LEVELING AND MEASURING INSTRUMENT
Filed Feb. 13, 1951　　　　　　　　　　　　2 SHEETS—SHEET 1

INVENTOR.
Thomas H. Foster,
Stanley R. Vickery,
BY Victor J. Evans & Co.
ATTORNEYS Dec. 2, 1952     S. R. VICKERY ET AL     2,619,732
SCIENTIFIC LEVELING AND MEASURING INSTRUMENT
Filed Feb. 13, 1951     2 SHEETS—SHEET 2
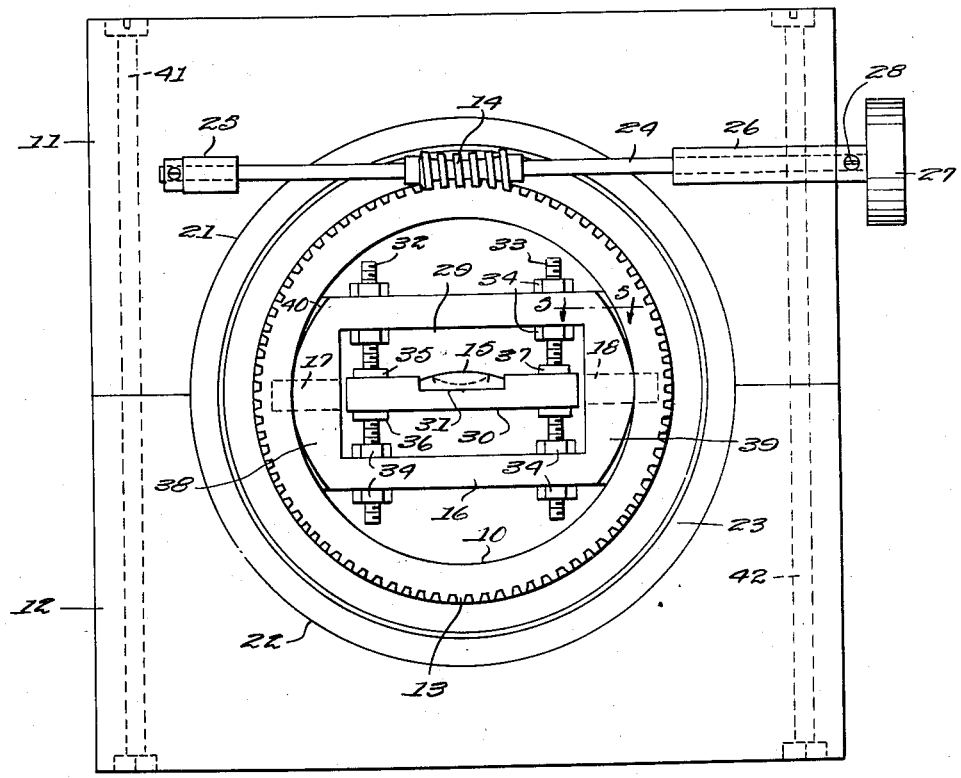
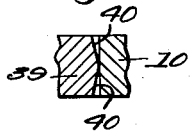
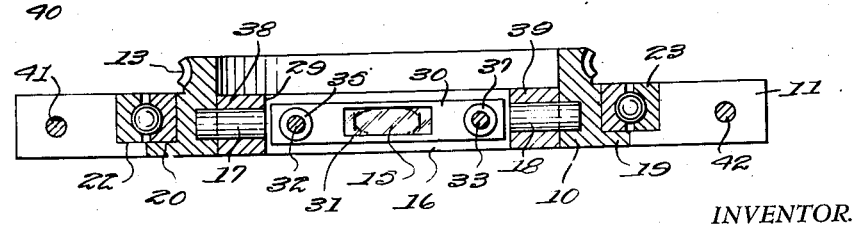
INVENTOR.
Thomas H. Foster,
Stanley R. Vickery,
BY Victor J. Evans &co.
ATTORNEYS Patented Dec. 2, 1952

2,619,732

UNITED STATES PATENT OFFICE 2,619,732

SCIENTIFIC LEVELING AND MEASURING INSTRUMENT

Stanley R. Vickery and Thomas H. Foster, Robstown, Tex.

Application February 13, 1951, Serial No. 210,659

3 Claims. (Cl. 33—214)

This invention relates to scientific instruments for determining the angle or direction of a line, object or device with respect to the center of gravity of the earth, and in particular an instrument in the form of a level using the perimeter of a circle for its bearing and supporting a level tool in which means is provided for accurately adjusting the position of the level tool and also in which the threading or operating instrumentalities are provided with micrometer adjustments.

The purpose of this invention is to provide a scientific instrument for use on land, in the air, on the sea or under the sea for measuring angles in degrees or other units of measurement and which will operate with precision both statically or dynamically.

Various methods have been provided for adjusting the position of the bubble or tube in a spirit level or other level indicating instrument and spirit levels have been combined with various types of instruments. With the conventional instrument of this type, however, it is difficult to accurately position a bubble or glass in relation to a pointer or point and after the bubble is set it is also difficult to turn the device with precision for indicating different angles or degrees. With this thought in mind this invention contemplates a scientific measuring instrument in which a spirit level bubble is adjustably mounted in a ring and the ring is adjusted by a manually actuated knob through a worm gear journalled by a ball bearing and extended around the periphery thereof in a square base.

The object of this invention is, therefore, to provide means for mounting and actuating a ring containing a spirit level whereby graduations on the periphery of the ring register with corresponding graduations on the face of a mounting frame.

Another object of the invention is to provide means for scientifically actuating the level indicating elements of a leveling device in which the relative positions of the parts are adjustable.

A further object of the invention is to provide a scientific leveling and measuring instrument which is of a simple and economical construction.

With these and other objects and advantages in view the invention embodies a substantially square base having a ring journalled therein with the meeting edges of the ring and base having equally spaced graduations thereon and with the position of the ring being adjustable by a knob with worm gears and furthermore with the ring provided with a level indicating element that is adjustably mounted therein.

Other features and advantages of the invention will appear from the following description taken in connection with the drawings wherein:

Figure 3 is a rear view looking toward the back of the instrument and showing the positions of the parts reversed.

Figure 4 is a cross section through the instrument being taken on line 4—4 of Fig. 1.

Figure 5 is a detail taken on line 5—5 of Fig. 3 illustrating the relative positions of the level carrying frame and spring in which the frame is mounted.

Figure 1:
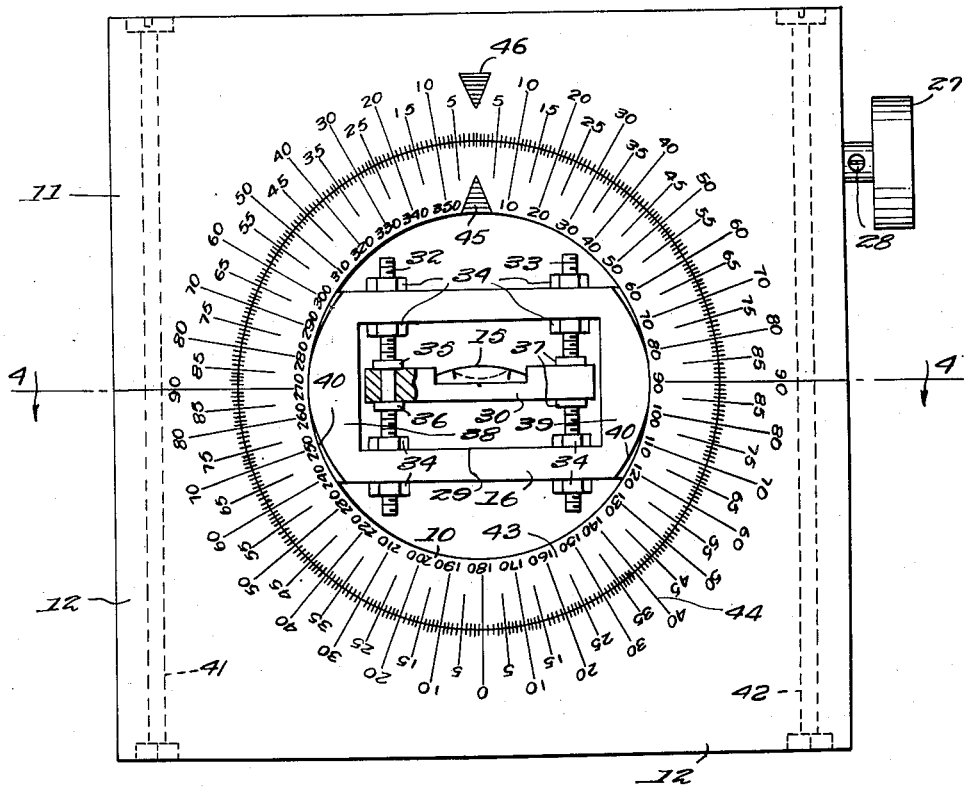
Figure 1 is a plan view of the improved scientific leveling and measuring instrument.
Figure 2:
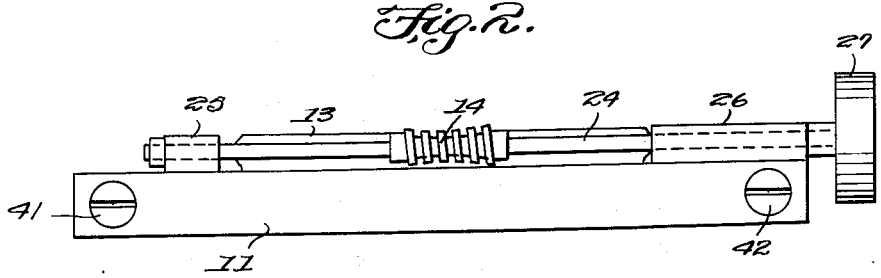
Figure 2 is an end elevational view looking downwardly upon the upper end of the device as shown in Fig. 1.

Referring now to the drawings wherein like reference characters denote corresponding parts the improved scientific leveling and measuring instrument of this invention includes a ring 10 journaled in a frame formed with sections 11 and 12 and provided with a worm gear 13 that meshes with a pinion 14, and the ring 10 is provided with a level 15 that is adjustably mounted in a frame 16 and pivotally mounted in the ring 10 by pins 17 and 18.

The ring 10 is formed as illustrated in Fig. 4 and the base is provided with a flange 19 which provides a recess 20 in the peripheral edge of the ring and the recess 20 coacts with corresponding recesses 21 and 22 in the sections 11 and 12 of the base to provide mounting means for a ball bearing 23.

The worm 14 is mounted on a shaft 24 that is journaled in bearings 25 and 26 on the rear surface of the base and, as illustrated in Fig. 3 the shaft 24 extends beyond the base and a knob 27 is secured thereon by a set screw 28. By this means the knob 27 may be rotated by the thumb and forefinger of a hand so that the position of the ring 10 is readily adjustable in the base.

The bar 30 in which the tool 15 in which the leveling bubble is positioned and carried is adjustably mounted in the opening 29 of the frame 16 by adjusting screws 32 and 33, as illustrated in Fig. 3. The adjusting screw 32 is provided with lock nuts 34 and similar lock nuts are provided on the screw 33. The screw 32 is also provided with collars 35 and 36 that engage opposite sides of the bar 30 and similar collars or shoes as indicated by the numeral 37 are provided on the adjusting screw 33.

The frame 16 has arcuate ends 38 and 39 and the ends are provided with arcuate surfaces, as indicated by the numeral 40 to facilitate rotation of the frame in the ring.

The sections 11 and 12 are held together by bolts 41 and 42, the ends of which are countersunk in the outer edges of the sections 11 and 12.

The base of the ring 10 is provided with radially disposed graduations 43 and corresponding graduations, as indicated by the numeral 44 are positioned on the faces of the sections 11 and 12 of the block. The ring 10 is also provided with a point 45 and the point 45 is positioned to register with similar points 46 on the face of the base.

With the parts arranged in this manner the device may be positioned upon a flat surface, or positioned against a wall, window or door frame, and by turning the knob 27 the exact angle of the surface upon which the device is positioned is readily determined.

With the frame 16 pivotally mounted on the pins 17 and 18 the frame with the spirit level 15 may be positioned perpendicular to the base or at any suitable angle in relation thereto and with the ends of the spirit level bar 30 clamped between the shoes 38 of the adjusting screws by which both ends of the frame are positioned the position of the spirit level is readily adjustable.

It will be understood that modifications may be made in the design and arrangement of the parts without departing from the spirit of the invention.

What is claimed is:

1. A leveling instrument comprising a base having flat sides and having an opening therethrough, a ring having a worm gear thereon journaled on the base and positioned in the opening therethrough, the peripheral edge of the ring being in meeting relation with the annular inner edge of the opening through the base, the meeting edges of the said ring and base having radially disposed graduations thereon, a shaft positioned on the back of the base, a worm gear on the shaft, bearings mounting the said shaft on the base with the worm gear meshing with the worm gear of the ring, a knob on the outer end of the said shaft, a frame having an opening therethrough pivotally mounted in the ring, a spirit level positioned in the opening through the said frame, and adjusting screws threaded in the frame and positioned to engage opposite ends of the spirit level for adjustably mounting the spirit level in the frame.

2. A leveling instrument comprising a base having flat sides and having an opening therethrough, a ring having a worm gear thereon journaled in the base and positioned in the said opening therein, the peripheral edge of the ring being in meeting relation with the annular inner edge of the opening through the base, the meeting edges of said ring and base having spaced radially disposed graduations thereon, said base having a pointer thereon, said ring also having a pointer thereon and positioned to register with the pointer of the base, a worm gear mounted on the base and positioned to coact with the worm gear of the ring for rotating the ring, a rectangular shaped frame having arcuate ends positioned in the opening in the ring, means pivotally mounting the frame in the ring with the outer surface of the frame flush with the outer surface of the ring, said frame mounted to turn to a position perpendicular to the ring, a spirit level positioned in the opening in the frame, adjusting screws extended through the ends of the spirit level and through the sides of the frame, and lock nuts on said adjusting screws for positioning the spirit level in relation to the graduations on the ring.

3. In a scientific leveling instrument, the combination which comprises a panel having equal sides and ends providing a square and having a centrally disposed opening therethrough, a ring having a worm gear thereon journaled in the said opening, a worm journaled on the back of the base meshing with the said worm gear, a shaft upon which the worm is mounted journaled on the base and having an end extended from one side of the base, a knob mounted on the extended end of the shaft, the peripheral edge of the ring being in meeting relation with the edge of the base around the opening therethrough and the said meeting edges of the ring and base having spaced graduations thereon, a frame pivotally mounted in the ring and formed to be positioned with the outer surface thereof flush with the face of the ring or with the outer surface thereof perpendicular with the face of the ring, a bar having a recess with a tube having a bubble therein positioned in the recess, adjusting screws extended through the ends of the bar and also through the sides of the frame positioning the bar having the tube with the bubble therein in the said frame, and lock nuts on the adjusting screws for adjusting the position of the said bar.

STANLEY R. VICKERY.
THOMAS H. FOSTER.

REFERENCES CITED

The following references are of record in the file of this patent:

UNITED STATES PATENTS

| Number | Name | Date |
|---|---|---|
| 306,429 | Rich | Oct. 14, 1884 |
| 785,581 | Shorts | Mar. 21, 1905 |
| 809,275 | Brown et al. | Jan. 2, 1906 |
| 935,807 | Oswald | Oct. 5, 1909 |
| 1,215,035 | Kacisko | Feb. 6, 1917 |
| 1,393,328 | Thullen | Oct. 11, 1921 |
| 2,129,695 | Karnes | Sept. 13, 1938 |
| 2,541,641 | Dodson | Feb. 13, 1951 |